US008991783B2

(12) United States Patent
Abe et al.

(10) Patent No.: US 8,991,783 B2
(45) Date of Patent: Mar. 31, 2015

(54) FUEL INJECTION VALVE FOR INTERNAL COMBUSTION ENGINE

(75) Inventors: Motoyuki Abe, Hitachinaka (JP); Masahiko Hayatani, Hitachinaka (JP); Tohru Ishikawa, Kitaibaraki (JP); Takehiko Kowatari, Kashiwa (JP); Atsushi Takaoku, Hitachinaka (JP); Yasuo Namaizawa, Naka (JP); Yusuke Irino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 298 days.

(21) Appl. No.: 12/920,559

(22) PCT Filed: Jul. 29, 2009

(86) PCT No.: PCT/JP2009/003571

§ 371 (c)(1), (2), (4) Date: Nov. 29, 2010

(87) PCT Pub. No.: WO2010/032357

PCT Pub. Date: Mar. 25, 2010

(65) Prior Publication Data

US 2011/0155103 A1 Jun. 30, 2011

(30) Foreign Application Priority Data

Sep. 17, 2008 (JP) ................................. 2008-237501

(51) Int. Cl.
*F16K 31/02* (2006.01)
*F02M 51/06* (2006.01)

(52) U.S. Cl.
CPC ....... *F02M 51/0653* (2013.01); *F02M 2200/02* (2013.01); *F02M 2200/90* (2013.01); *F02M 2200/9061* (2013.01)
USPC ................ 251/129.16; 239/533.2; 239/533.9; 239/533.11; 239/585.3

(58) Field of Classification Search
USPC .................. 239/533.2–533.5, 533.9–533.12, 239/584–585.5; 251/129.16
See application file for complete search history.

(56) References Cited

U.S. PATENT DOCUMENTS 5,732,888 A * 3/1998 Maier et al. ................ 239/585.1
5,996,911 A * 12/1999 Gesk et al. ................. 239/585.1

(Continued)

FOREIGN PATENT DOCUMENTS

DE 44 21 947 A1 6/1995
JP 2003-328891 A 11/2003

(Continued)

OTHER PUBLICATIONS

Japanese Office Action dated Nov. 22, 2011 w/ English translation (four (4) pages).

(Continued)

*Primary Examiner* — John K Fristoe, Jr.
*Assistant Examiner* — Ian Paquette
(74) *Attorney, Agent, or Firm* — Crowell & Moring LLP

(57) ABSTRACT

In a fuel injection valve, it is intended to enhance valve-closing responsivity while maintaining durability (anti wear property) of a collision portion between a stationary core and a movable core and valve-opening responsivity.

An annular end face 106A of the movable core 106 in the fuel injection valve is provided with a collision portion 106C that collides to a stationary core 107 when the movable core is magnetically attracted toward the stationary core side and a non-collision portion that keeps a fluid gap between both cores at an area of an outer side or an inner side from the collision portion. The annular end faces of the stationary core and the movable core are coated with platings 30, 31 having anti wear property, and at least one of the platings of the stationary core and the movable core is formed in such a manner that the thickness thereof at the collision portion 106C is to be thicker and the thickness thereof at the non-collision portion is to be thinner.

5 Claims, 5 Drawing Sheets

(56) References Cited

U.S. PATENT DOCUMENTS

| | | | | |
|---|---|---|---|---|
| 7,051,960 | B2 * | 5/2006 | Oguma | 239/585.1 |
| 7,086,614 | B2 * | 8/2006 | Stier et al. | 239/585.2 |
| 8,104,698 | B2 | 1/2012 | Hayatani et al. | |
| 2006/0027682 | A1 | 2/2006 | Aoki et al. | |
| 2006/0113503 | A1 * | 6/2006 | Mennicken et al. | 251/129.15 |
| 2006/0214033 | A1 | 9/2006 | Koyanagi et al. | |

FOREIGN PATENT DOCUMENTS

| | | | |
|---|---|---|---|
| JP | 2005-36696 | A | 2/2005 |
| JP | 2006-22727 | A | 1/2006 |
| JP | 2006-266231 | A | 10/2006 |
| WO | WO2008/038395 | A1 | 4/2008 |

OTHER PUBLICATIONS

Extended European Search Report dated Oct. 10, 2011 (six (6) pages).

International Search Report dated Sep. 8, 2009 (two (2) pages).

* cited by examiner

FUEL INJECTION VALVE FOR INTERNAL COMBUSTION ENGINE

FIELD OF THE INVENTION

The present invention relates to a fuel injection valve for an internal combustion engine and, in particular, relates to a plating coat structure formed on opposed faces of a stationary core and a movable core having a movable valve element.

BACKGROUND ART

A fuel injection valve used for an internal combustion engine for an automobile (hereinafter will be called as "engine") comprises an electromagnetic coil, a movable valve element, a stationary core, a movable core and a spring (return spring), wherein end faces of the movable core and the stationary core are opposed to each other with a predetermined gap when the electromagnetic coil is not energized, and the return spring applies the spring load to the movable core and the movable valve element in the direction of valve-closing. The movable core is magnetically attracted toward the stationary core side against the spring force when the electromagnetic coil is energized and the movable valve element moves toward the stationary core side with the magnetic attraction to thereby make valve-opening.

Fuel is fed into a body of the injection valve from a fuel tank via a fuel pump and a fuel-feeding pipe, and is filled under pressure in a fuel passage from the inside of the hollow-stationary core to a seat portion in a nozzle body when the valve is closed. When the electromagnetic coil is energized with a fuel injection pulse signal, the valve opens only during the pulse time and fuel is injected. When the energization of the electromagnetic coil is turned off, the movable core is returned in the valve-closing direction together with the movable valve element by the return spring force and the movable valve element is pressed to the seat to make a valve-closing state.

Enhancement of a valve-closing response is of a key factor for enhancing a control accuracy of a fuel quantity of the electromagnetic injection valve. At the time when the fuel injection valve closes just after energization to the electromagnetic coil is turned off, it is known that a fluid resistance force (force due to a squeeze effect) occurs between the opposed faces of the movable core and the stationary core and that the fluid resistance force is caused by a fluid existing between the both opposed faces thereof so as to make interference against motion where the movable core removes from the stationary core. Such fluid resistance force tends to increase as the gap between the opposed faces of the movable core and the stationary core (so called fluid gap) decreases.

Conventionally, a variety of measures has been proposed for reducing such force due to squeeze effect.

For example, patent document 1 (JP-A-2003-328891) discloses that a protuberance is provided on the opposed face of a movable core with respect to a stationary core, and only this protuberance collides against the stationary core at the time of magnetic attraction so that portions other than the protuberance (non colliding portion) keep fluid gap.

Further, in place of such protuberance, patent document 2 (JP-A-2006-22727) discloses that an uneven surface of high-lying portions and low-lying portions is provided at least one of opposed faces of a movable core (armature) and a stationary core (namely, the upstream side end face of the armature and the downstream side end face of the stationary coil) by forming alternatively hard plating portions and non-plating portions on the core end face in a circumference direction thereof so as to keep fluid gaps on the low-lying portions by the height of the high-lying portions.

Still further, patent document 3 (JP-A-2005-36696) discloses that an annular collision face (a collision face with respect to a stationary core) with a limited width is provided on an annular end face of a movable core, and the collision surface is formed at an inner side with respect to a middle portion in the width direction of the annular end face of the movable core. Further, the document proposes to form tapered surfaces toward the inner side as well as the outer side from the collision surfaces and to apply anti wear plating on the annular end face. The proposed technology is intended to reduce squeeze effect by enlarging the fluid gap between the opposed faces of the movable core and the stationary core other than the collision surfaces through formation of the tapered surfaces.

PRIOR ART DOCUMENTS

Patent Documents

Patent Document 1: JP-A-2003-328891
Patent Document 2: JP-A-2006-22727
Patent Document 3: JP-A-2005-36696

SUMMARY OF THE INVENTION

Tasks to be Solved by the Invention

As disclosed in patent documents 1 or 3, in order to reduce squeeze effect when the movable core is magnetically attracted toward the stationary core (in other words, in order to increase the fluid gap between the stationary core and the movable core), the protuberances or tapered portions are provided on the opposed face of the movable core with respect to the stationary core, when the collision portions are limited partially where the movable core collides against the stationary core at the time of magnetic attraction, the collision load is concentrated on the portions where the collision portions locate. For this reason, in order to enhance durability (anti wear property) of the collision portions of the movable core and the stationary core, it is necessary to make a hard plated film comparatively thick on the collision portions. On the other hand, although it is desirable to make the gap between the opposed faces of the movable core and the stationary core (magnetic attraction surfaces) as small as possible from a viewpoint of magnetic attraction, if the plated film is thickened as above, the magnetic gap that is the sum of the protuberance and the film thickness enlarges.

In place of these protuberances, according to the arrangement of providing an uneven surface on at least one of opposed faces of a movable core (armature) and a stationary core by forming alternatively hard plating portions and non-plating portions on the annular end face in the circumference direction thereof, as shown in patent document 2, when forming the plated portions, a complicated work of masking for the non-plating portions is required that complicates the plating work.

The present invention has been invented in view of the above circumstances and is to provide a fuel injection valve for an internal combustion engine capable of enhancing valve-closing responsivity while maintaining durability (anti wear property) of the collision portion and valve-opening responsivity in the fuel injection valve of a type in which basically a collision portion (such as annular protuberance)

confined to a partial area is provided on at least one of annular opposed end faces of a stationary core and a movable core.

Measure for Solving the Tasks

Basically, a fuel injection valve for an internal combustion engine using a solenoid valve according to the present invention comprises a stationary core and a movable core like those as above and is provided with collision portions on annular end faces of these cores opposed to each other, wherein the collision portions receive collision caused when the movable core is magnetically attracted to the stationary core side, and a non-collision portion is located in an area of an outer side or an inner side from the collision portion to keep a fluid gap. Further, the present invention is characterized in that the annular end faces of the stationary core and the movable core is provided with a plating having anti wear property, and at least one of the platings on the stationary core and the movable core is formed to be thicker on the collision portion and thinner on the non-collision portion.

In place of the above configuration, the present invention further proposes a configuration in which the annular end faces of the stationary core and the movable core like those as above are respectively divided into two of an inner side and an outer side in a radial direction thereof, the inner side takes on an area provided with a plating having anti wear property and the outer side takes on an area provided with non-plating, and an protuberance serving as the collision portions between the cores are coated by plating respectively, and the non-collision portion is formed by the non-plating area.

Advantages of the Invention

According to such configurations, at first, the height of the collision portion (the protuberance or the tapered tip portion) formed on at least one of the annular end faces (opposed faces) of the movable core and the stationary core can be reduced, and corresponding thereto, the plating thickness of the collision portion can be ensured sufficiently. Thereby, the responsivity (valve-opening responsivity) to magnetic attraction of the fuel injection valve (solenoid coil) can be maintained while preventing enlargement of a magnetic gap between the opposed faces of the movable core and the stationary core. Further, it is possible to thin the plating thickness on the area other than the collision portion of the opposed annular end faces or to provide the non-plating thereon, so that an enlargement of the fluid gap and reduction of squeeze effect can be achieved.

EMBODIMENTS FOR CARRYING OUT THE INVENTION

Figure 1:
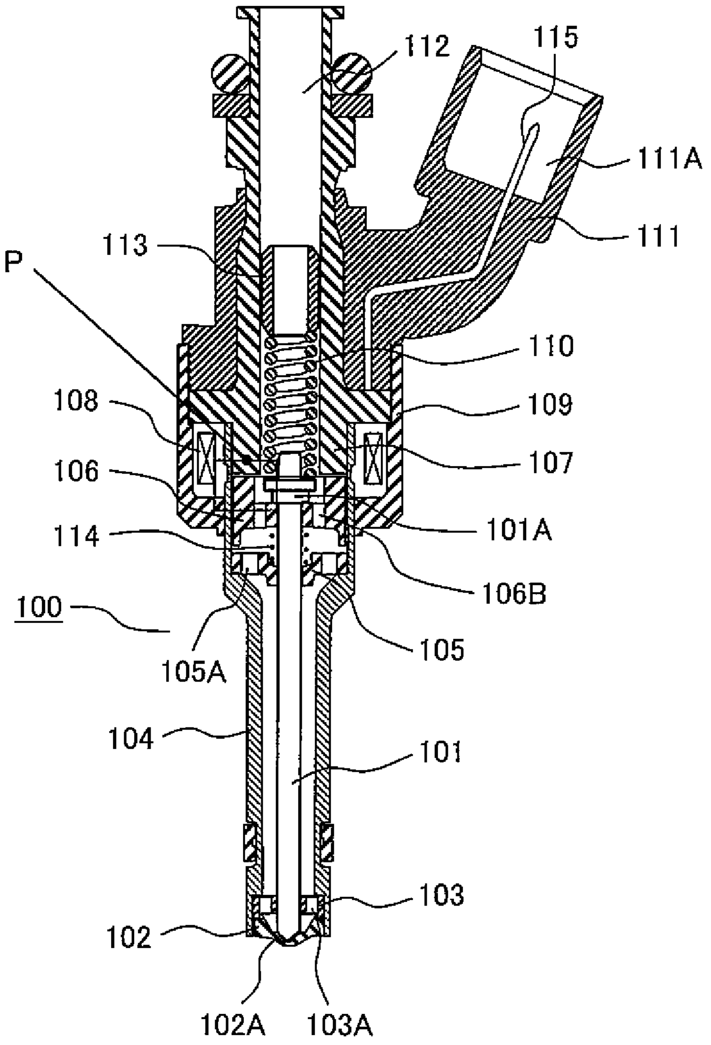
FIG. 1 is a vertical cross sectional view showing an entire configuration representing one example of a fuel injection valve to which the present invention is applied.

Preferred embodiments of the present invention as shown in the drawings will be explained.

Figure 2:
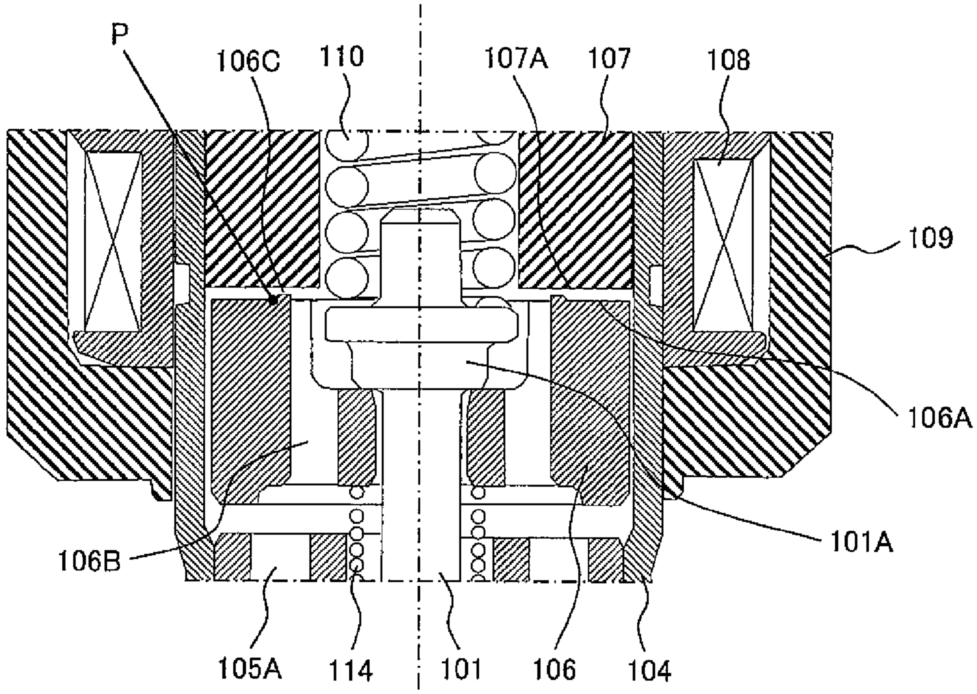
FIG. 2 is a partially enlarged vertical cross sectional view showing around the annular end face portion of opposed stationary core and movable core in the vertical cross sectional view of FIG. 1.

FIG. 1 is a vertical cross sectional view showing an entire constitution representing one example of a fuel injection valve to which the present invention is applied, and FIG. 2 is a partially enlarged vertical cross sectional view showing around the annular end face portion of opposed stationary core and movable core in the vertical cross sectional view of FIG. 1.

A fuel injection valve main body 100 comprises a hollow stationary core 107 having a fuel passage 112 therein, a yoke 109 serving also as a housing, a nozzle body 104, a movable core 106 and a valve element 101. With regard to the movable core 106 and a movable valve element 101, the needle shaped-valve element 101 is inserted through a middle aperture of the movable core 106 in a cylindrical shape with a bottom so as to enable to move relative to the movable core in an axial direction thereof. At the upper side of the valve element 101, a flange 101A is provided integrally with the valve element, and the flange 101A is supported on the inside of the bottom of the movable core 106.

The inside of the stationary core 107 is provided with a spring 110 that applies the spring load to the valve element 101 in a valve-closing-direction, namely, toward a seat portion 102A provided at the lower end side of the nozzle body 104 and an adjustor 113 for adjusting the spring load of the spring. The spring 110 is disposed between the adjustor 113 and the upper surface of the flange 101A of the valve element 101 to apply the spring load to the valve element 101 in the valve-closing direction.

A buffer spring 114 is disposed between the outside of the bottom of the movable core 106 and a valve element guide member 105 fixed at the upper side of the nozzle body 104. The force of the buffer spring 114 is set to be sufficiently smaller than the spring 110.

When the movable core 106 is magnetically attracted to the stationary core 107 side by energizing the electromagnetic coil 108, the valve element 101 is lifted up together with the movable core 106 to do valve-opening operation. In contrast to that, when the energization to the electromagnetic coil 108 is turned off, the valve element 101 is press-returned in the valve-closing direction (toward the seat 102A) by the force of the spring 110, and the movable core 106 also receives the press-returned force via the flange portion 101A of the valve element 101 and moves together with the valve element 101.

The stationary core 107, the yoke 109 and the movable core 106 serve as constitutional elements for a magnetic circuit.

The yoke 109, the nozzle body 104 and the stationary core 107 are joined by welding. The electromagnetic coil 108 sealed by resin mold is incorporated within the yoke 109.

At the top end of the nozzle body 104, an orifice plate 102 provided with the seat 102A and an orifice (illustration is omitted) serving as an injection hole is fixed by welding. The movable core 106, the valve element 101, an upper side valve guide member 105 and a lower side valve guide member 103 are incorporated inside the nozzle body 104.

The fuel passage in the injection valve is constituted by the inner flow passage 112 in the stationary core 107, a plurality of holes 106A provided in the movable core 106, a plurality of holes 105A provided in the guide member 105, the inside of the nozzle body 104 and a plurality of holes 103A provided in the guide member 103.

A resin cover 111 is provided with a connector portion 111A for supplying an excitation current (pulse current) to the electromagnetic coil 108, and a part of a lead terminal 115 insulated by the resin cover 111 positions in the connector portion 111A.

When the electromagnetic coil 108 is energized by an external drive circuit (not illustrated) via the lead terminal 115, the stationary core 107, the yoke 109 and the movable core 106 constitute a magnetic circuit, the movable core 106 is magnetically attracted against the force of the spring 110, and collides with the downstream side end face of the stationary core 107. At this moment, the valve element 101 is also lifted up by the movable core 106 and removes from the seat 102A to make an open valve condition, and the fuel in the injection valve main body that is pressurized in advance (more than 10 MPa) by an external high pressure pump (not illustrated) is injected via the injection hole.

When excitation of the electromagnetic coil 108 is turned off, the valve element 101 is pressed to the seat portion 102A side by the force of the spring 110 to thereby make a close valve condition. At the time of closing the valve element 101, although the valve element 101 collides with the seat portion 102A, the movable core 106 moves slightly relative to the valve element 101 due to inertia force against the buffer spring 114, thereafter the movable core 106 is returned to a position where the same comes into contact with the flange portion 101A of the valve element 101 by the force of the buffer spring 114. Through these operations, rebounding of the valve element 101 at the time of collision is suppressed.

Now, embodiments with regard to structural examples of the downstream side annular end face 107A of the stationary core 107 and the upstream side annular end face 106A of the movable core 106 as shown in FIG. 2 will be explained with reference to FIGS. 3 through 9.

Figure 3:
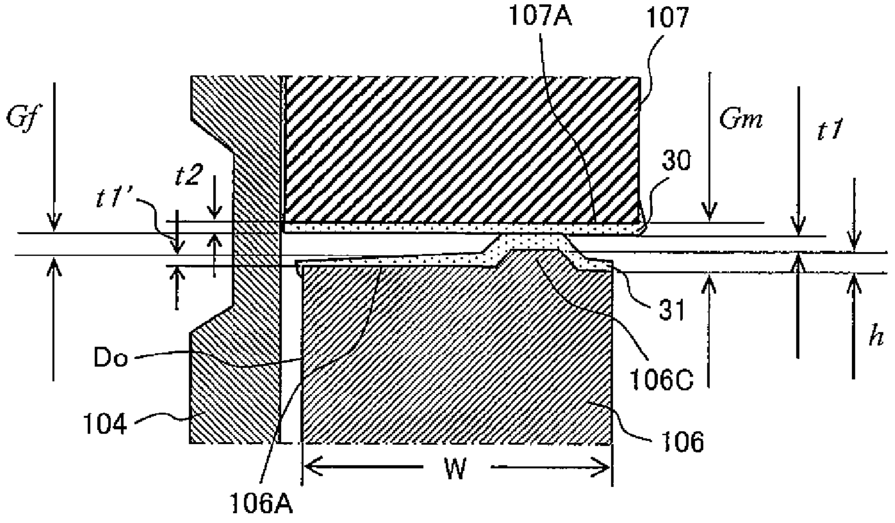
FIG. 3 is a partially enlarged vertical cross sectional view showing the annular end face portion of the stationary core and the movable core of a fuel injection valve according to a first embodiment of the present invention.

FIG. 3 is a partially enlarged vertical cross sectional view (around the portion indicated by symbol P in FIGS. 1 and 2) of an prime portion showing the annular end face portions of the stationary core and movable core of the fuel injection valve according to a first embodiment of the present invention.

In the present embodiment, among the opposed annular end faces 107A and 106A of the stationary core 107 and the movable core 106, an annular protuberance 106C constituting the collision portion against the stationary core 107 is provided on the annular end face 106A at the movable core 106 side. The annular protuberance (collision portion) 106C is provided at an inner side from the middle position in the width direction of the annular end face 106A. FIG. 3 shows a condition where the movable core 106 is magnetically attracted to the side of the stationary core 107. Areas of non-collision portions for keeping fluid gap Gf are constituted by the areas of the outer side and the inner side from the annular protuberance 106C representing the collision portion.

The annular end faces 107A and 106A of the stationary core 107 and the movable core 106 are applied with platings 30 and 31 having anti wear property. The plated coatings are of non magnetic materials, for example, constituted by such as hard chromium coating or electroless nickel coating. In the present embodiment, the thickness of the plating 30 at the stationary core 107 side is formed uniformly, on the other hand, the thickness of the plating 31 at the movable core 106 side is formed in such a manner that the coating thickness t1 at the collision portion (protuberance portion) 106C is maximized, the coating thickness t1' at the area of non-collision portion outside the collision portion is formed thinner than t1 and the thickness thereof is continuously (in sloping manner) decreased toward the side of outer diameter Do of the movable core 106.

The magnetic gap Gm at the time when the movable core 106 is magnetically attracted to the stationary core 107 (valve-opening time) is expressed by the total sum (Gm=h+t1+t2) of the height h of the collision portion (protuberance portion) 106C, the plating thickness t1 on the collision portion at the movable core 106 side and the plating thickness t2 at the side of the stationary core 107 opposed thereto. The magnetic gap Gm at the time of valve-closing is determined by adding to the above total sum the separated distance between the collision portions of the movable core and the stationary core. Further, the fluid gap Gf is a value obtained by subtracting the plating thickness from the magnetic gap Gm. In the present embodiment, the most part of the non-collision portion is located outside (outer diameter side) from the collision portion and the area is larger than other area thereof because the part is located at the outer side. For this reason, a force due to squeeze effect acting on the area of the non-collision portion becomes large, and which causes to reduce the responsivity. Since the plating thickness t1' at the non-collision portion is made thinner than the plating thickness t1 at the collision portion (t1' is made to decrease continuously), the fluid gap Gf between the movable core and the stationary core at the non-collision portion located outside from the collision portion satisfies a relationship of fluid gap (Gf) >height h of collision portion (protuberance portion) 106C.

When enumerating a specific numerical example of the above, for example, in the case where the outer diameter of the movable core 106 is about 10 mm, the inner diameter thereof is about 5 mm and the width W of the annular end face is about 2.5 mm, and when setting the height h of the collision portion as in the range of 10~25 μm (herein 20 μm), the plating thickness t1 at the collision portion as in the range of 10~20 μm (herein 15 μm), the plating thickness t2 at the stationary core 107 as about 10 μm and the plating thickness t1' at the outer diameter position of the movable core as below 5 μm, wherein the plating thickness t1' is of the non-collision portion outside from the collision portion and is continuously decreased from the thickness at the collision portion toward the outer diameter of the movable core, it is preferable to determine the magnetic gap Gm as about 45 μm and the fluid gap Gf as about 25 μm~30 μm. When setting and determining the size relationship as above, the fluid gap can be increased by about 5~15 μm in comparison with those not using the present invention. Since the fluid resistance force due to squeeze effect is inversely proportional to a cube of size of the fluid gap, even when the fluid gap increase is of about 5 μm, an advantage of reducing the force due to squeeze effect can be obtained.

In contrast to the above example, when the plating thickness of the movable core 106 is made almost the same (uniform) as the thickness t1 at the collision portion over the entire region (comparative example), with regard to the fluid gap Gf, since a relationship of Gf=h (the height of the collision portion) stands, when the numerical conditions except for the movable core are set as in the above, since the fluid gap Gf becomes 20 μm which is smaller than the fluid gap 25 μm~30 μm in the above embodiment, this results in an increase of squeeze effect (fluid resistance force) $S_F$.

Figure 5:
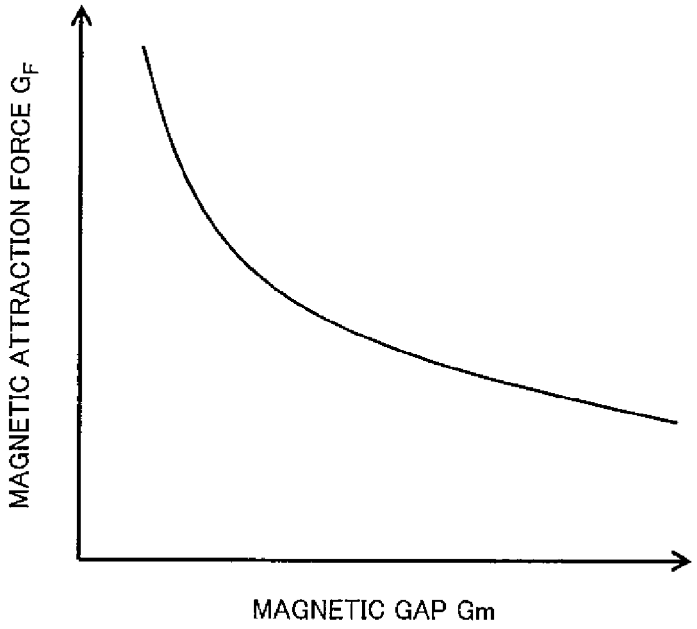
FIG. 5 is a graph showing a relationship between magnetic gap Gm between a stationary core and a movable core and magnetic attraction force $G_F$.
Figure 6:
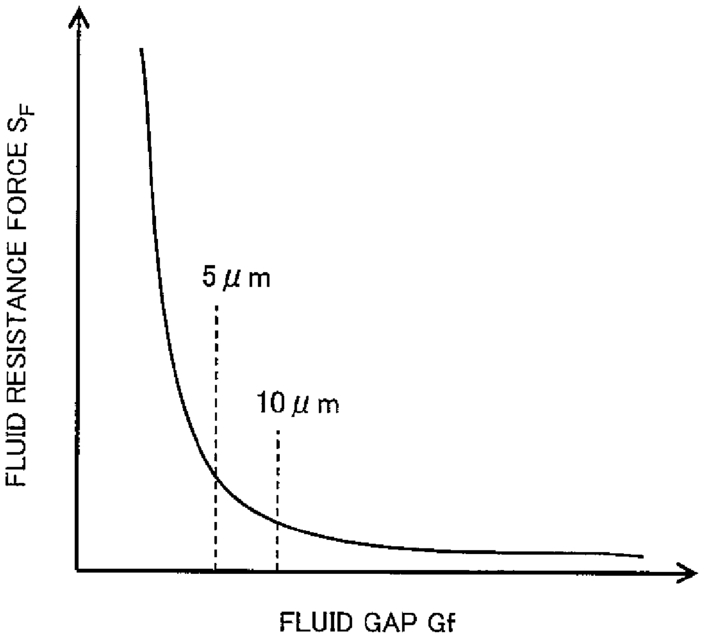
FIG. 6 is a graph showing a relationship between fluid gap Gf between a stationary core and a movable core and fluid resistance force $S_F$.

Here, as shown in FIG. 6, the smaller the gap Gf between the opposed faces of the movable core and the stationary core is, the larger the fluid resistance force becomes ($S_F \propto 1/Gf^3$), however, according to the present embodiment, since the fluid resistance force $S_F$ can be reduced without increasing the magnetic gap Gm, the squeeze effect can be reduced. By the way, as shown in FIG. 5, the smaller the magnetic gap Gm is, the larger the magnetic attraction force $G_F$ becomes ($G_F \propto 1/Gm^2$).

According to the present embodiment, the operation responsivity of the movable core from turning off energization to the electromagnetic coil until the valve-closing can be improved and the delay of valve-closing can be improved by 20%~50% in comparison with the comparative example. This improved advantage can contribute to higher dynamic range and higher fuel pressure that are particularly required for recent engines.

Particularly, according to the present embodiment, it is possible to satisfy the conditions for reducing the magnetic gap (enhancement of magnetic attraction force) by decreasing the height of the collision portion (protuberance portion) and for decreasing the fluid resistance (reduction of fluid resistance force: squeeze effect) while keeping a sufficient thickness of the plating at the collision portion in view of durability thereof.

A method of varying the plating thickness, in the case of electrolytic plating such as hard chromium, can be executed by an arrangement of plating electrodes being set in such a manner that the plating current density is set higher at a portion where the plating thickness is desired to be thicker than at other portions and the plating current density is set lower at a portion where the plating thickness is desired to be thin than at other portions. For example, from the viewpoint of the positional relationship between one (electrode positioned at the side to be plated) of the plating electrodes and a portion to be plated, since it can realized by positioning the electrode closer to a portion where thick plating is desired than a portion where thin plating is desired, no complexity is accompanied in connection with the plating work. The plating current density and plating current flowing time can be set arbitrary depending on the plating thickness.

Incidentally, the annular protuberance 106C and the structure of the plating 31 of which thickness varies as above can be provided at the stationary core 107 side instead of the movable core 106 side. Further, in contrary to the above first embodiment, the annular protuberance 106C can be provided at the outer side from the middle position in the width direction of the annular end face, and the plating 31 can be formed from the collision portion (annular protuberance 106C) toward the inner side in the width direction of the annular end face in such a manner that the thickness thereof continuously decreases.

FIGS. 4 and 7~9 are vertical cross sectional views showing prime parts of other embodiments of the present invention, and the same reference numerals as in the previous embodiment show the same or equivalent elements as those therein. Further, in FIGS. 4 and 7~9, the fuel injection valve is shown in valve closed condition, namely, the condition where the movable core 106 is separated from the stationary core 107.

Figure 4:
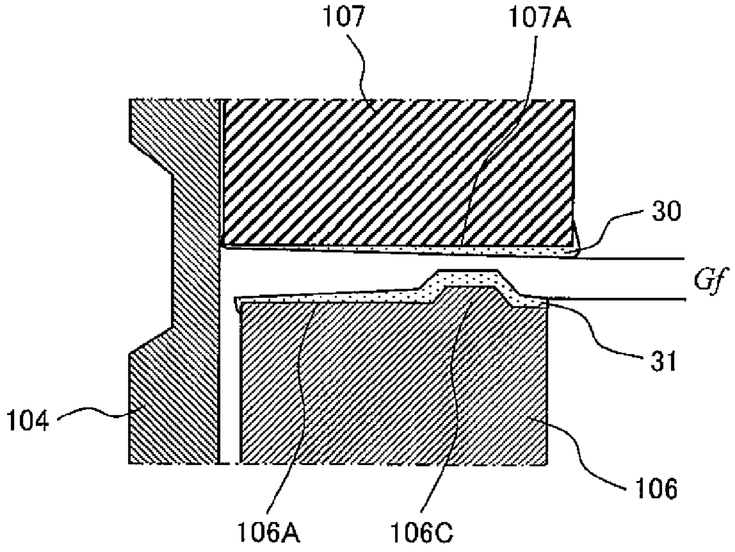
FIG. 4 is a partially enlarged vertical cross sectional view showing the annular end face portion of the stationary core and the movable core of a fuel injection valve according to a second embodiment of the present invention.

FIG. 4 is a second embodiment of the present invention, in which the thickness of a plating 30 on a downstream side-annular end face 107A of the stationary core 107 is also continuously decreased with a gradient from the inner side toward the outer side like the side of the movable core 106. The constitution other than the thickness of the plating 30 is the same as of the first embodiment.

Figure 7:
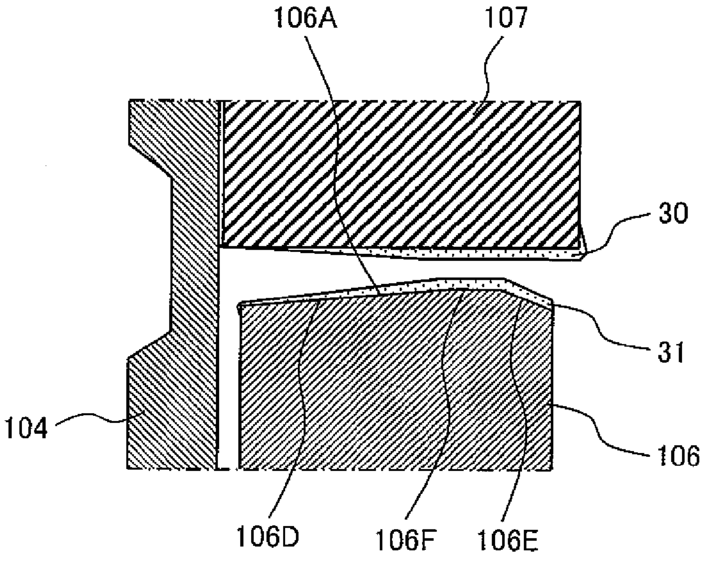
FIG. 7 is an enlarged vertical cross sectional view of a prime part showing a third embodiment of the present invention.

FIG. 7 is an enlarged vertical cross sectional view showing prime portions of a third embodiment of the present invention.

In the present embodiment, a collision portion 106F provided on the movable core 106 is formed by an annular portion 106F provided at the inner side from the middle position in the width direction of the annular end face 106A. Further, this annular portion 106F is formed with a plane annular width between an outside tapered portion 106D and an inside tapered portion 106E, which will be explained later.

At least, the tapered portion 106D is formed so as to incline in the direction opposite to the stationary core 107 from this annular portion 106F toward the outer diameter of the movable core 106. The non-collision portion between the cores is formed by this tapered portion. On this tapered portion 106D, the plating 31 is formed so that the thickness thereof continuously decreases from the collision portion (annular portion) 106F toward the outer diameter side the movable core. The thickness of the plating 31 on the collision portion 106F and on the inner side therefrom is made thicker than that on the outer side.

Figure 8:
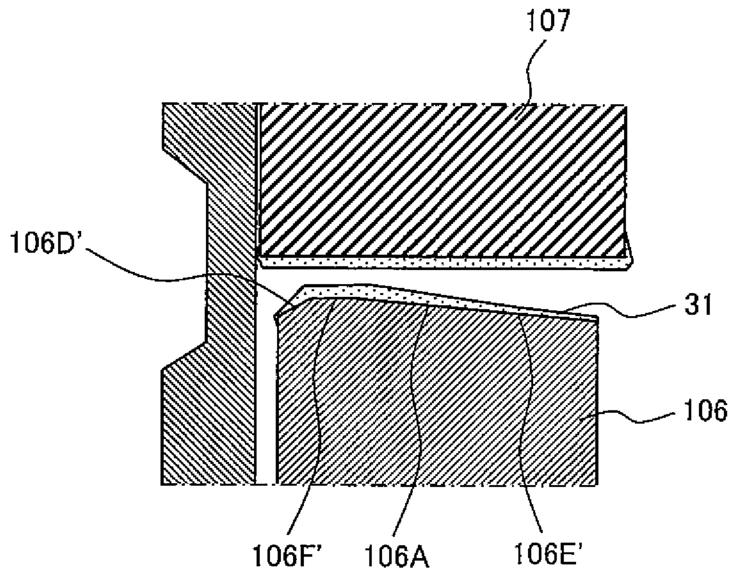
FIG. 8 is an enlarged vertical cross sectional view of a prime part showing a fourth embodiment of the present invention.

FIG. 8 is an enlarged vertical cross sectional view showing prime portions of a fourth embodiment of the present invention.

In the present embodiment, the collision portion and the structure of the tapered portion (non-collision portion) are inverted as those in the third embodiment. Namely, the collision portion provided on the movable core 106 is formed by an annular portion 106F' provided at the outer side from the middle position in the width direction of the annular end face 106A. Further, this annular portion 106F' is formed with a plane annular width between an outside tapered portion 106D' and an inside tapered portion 106E', which will be explained later.

At least, the tapered portion 106E' is formed so as to incline in the direction opposite to the stationary core 107 from this annular portion 106F' toward the inner diameter of the movable core 106. On this tapered portion 106E', the plating 31 is formed so that the thickness thereof continuously decreases from the collision portion (annular portion) 106F' toward the inner side of the movable core.

Further, the annular collision portions (106F, 106F') at the side of the movable core and the tapered portions (106D, 106D', 106E, 106E') as shown in connection with the third and fourth embodiments can be provided at the side of the stationary core instead of at the side of the movable core.

Figure 9:
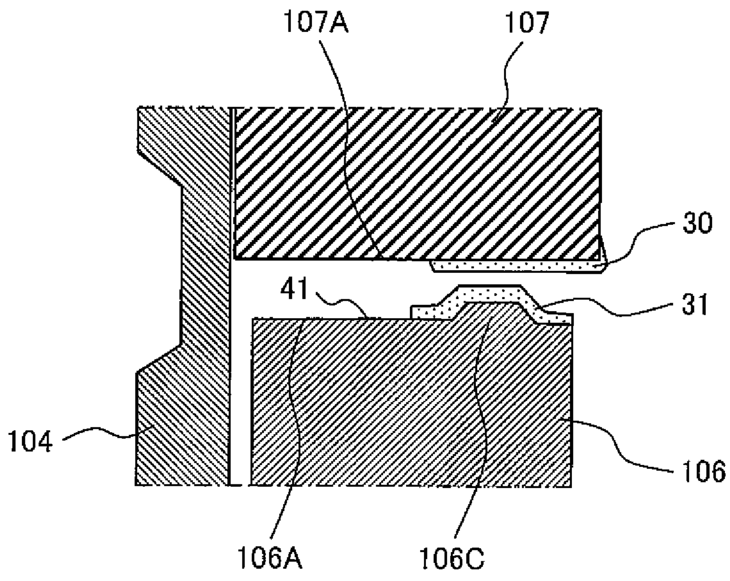
FIG. 9 is an enlarged vertical cross sectional view of a prime part showing a fifth embodiment of the present invention.

FIG. 9 is an enlarged vertical cross sectional view showing important portions of a fifth embodiment of the present invention.

In the present embodiment, the collision portion (annular protuberance) 106C provided on the annular end face 106A of the movable core 106 is provided at the inner side from the middle position in the width direction of the annular end face.

The annular end face 106A of the movable core 106 is divided in radial direction into two parts as an inner side and an outer side, the inner side is provided with an area 31 for forming a plating of anti wear property and the outer side is provided with an area 41 of non-plating. The annular protuberance 106C serving as the collision portion is coated by the plating 31, and the non-collision portion is constituted by the non-plating area 41.

Further, the annular end face 107A of the stationary core 107 is also divided in radial direction into two parts as an inner side and an outer side, and the inner side is used as an area 30 for forming a plating and the outer side is used as an area of non-plating.

Further, instead of the fifth embodiment, the collision portion (annular protuberance) 106C can be provided at the inner side from the middle position in the width direction of the annular end face. In this instance too, the annular end face 106A of the movable core 106 is divided in radial direction into two parts as an inner side and an outer side. The outer side is provided with an area 31 for forming a plating of anti wear property and the inner side is provided with an area 41 of non-plating. The annular protuberance 106C serving as the collision portion is coated by the plating 31, and the non-collision portion is constituted by the non-plating area 41. Further, in this instance too, the annular end face 107A of the stationary core 107 is also divided in radial direction into two parts as an inner side and an outer side, the outer side is provided with an area 30 for forming a plating and the inner side is provided with an area of non-plating.

With the above respective embodiments too, it is possible to satisfy the conditions for reducing the magnetic gap (enhancement of magnetic attraction force) by limiting the height of the collision portion (protuberance portion) and for increasing the fluid gap (reduction of fluid resistance force: squeeze effect) while keeping a sufficient thickness in view of durability thereof with regard to the plating at the collision portion.

EXPLANATION OF REFERENCE NUMERALS

30, 31 . . . Plating, 100 . . . Fuel injection valve, 101 . . . Valve element, 106 . . . Movable core, 106A . . . Annular end face at movable core side, 106C . . . Annular protuberance (collision portion), 106D, 106E . . . Tapered portion, 106F . . . Collision portion, 107 . . . Stationary core, 107A . . . Annular end face at stationary core side.

The invention claimed is:

1. A fuel injection valve for an internal combustion engine comprising an electromagnetic coil, a movable valve element, a stationary core, a movable core, and a spring, wherein the stationary core and the movable core are disposed in a moving direction of the movable valve element so that annular end faces of the stationary core and the movable core are opposed to each other with a predetermined gap when the electromagnetic coil is not energized, by the spring applying a spring load to the movable core in a closing-direction of the movable valve element, and the movable core is magnetically attracted toward the stationary core against force of the spring when the electromagnetic coil is energized, thereby to open the fuel injection valve, wherein the annular end faces of the stationary core and the movable core are provided respectively with collision portions that collide to each other when the movable core is magnetically attracted toward the stationary core and non-collision portions for keeping a fluid gap at areas outside or inside from the collision portions, at least one of the annular end faces of the stationary core and the movable core is comprised of an annular flat face formed at its non-collision portion and an annular protuberance formed at its collision portion so as to be higher than the annular flat face, the annular end faces of the stationary core and the movable core are coated respectively with platings having anti wear property, at least one of the platings of the stationary core and the movable core is formed in such a manner that a first thickness thereof over the annular protuberance of the collision portion is thicker than a second thickness thereof over the annular flat face of the non-collision portion, a relationship of the fluid gap and the annular protuberance is set so that the fluid gap is greater than a height of the annular protuberance, and the first thickness of the at least one of the platings is positioned closer to the movable valve element than the second thickness of the at least one of the platings.

2. The fuel injection valve for an internal combustion engine according to claim 1, wherein the annular protuberance of the collision portion is provided at an inner side from a middle position in a width direction of the annular end faces of the stationary core and the movable core, and the annular flat face of the non-collision portion and the annular protuberance of the collision portion are coated with the at least one of the platings in such a manner that the second thickness thereof continuously decreases from the collision portion toward outside in the width direction of the annular end faces.

3. The fuel injection valve for an internal combustion engine according to claim 1, wherein the annular protuberance of the collision portion is provided at an outer side from a middle position in a width direction of the annular end faces of the stationary core and the movable core, and the annular flat face of the non-collision portion and the annular protuberance of the collision portion are coated with the at least one of the platings in such a manner that a third thickness thereof continuously decreases from the collision portion toward inside in the width direction of the annular end faces.

4. A fuel injection valve for an internal combustion engine comprising an electromagnetic coil, a movable valve element, a stationary core, a movable core, and a spring, wherein the stationary core and the movable core are disposed in a moving direction of the movable valve element so that annular end faces of the stationary core and the movable core are opposed to each other with a predetermined gap when the electromagnetic coil is not energized, by the spring applying a spring load to the movable core in a closing-direction of the movable valve element, and the movable core is magnetically attracted toward the stationary core against force of the spring when the electromagnetic coil is energized, thereby to open the fuel injection valve, wherein the annular end faces of the stationary core and the movable core are provided respectively with collision portions that collide to each other when the movable core is magnetically attracted toward the stationary core and non-collision portions for keeping a fluid gap at areas outside or inside from the collision portions, at least one of the annular end faces of the stationary core and the movable core is comprised of an annular flat face formed at its non-collision portion and an annular protuberance formed at its collision portion so as to be higher than the annular flat face, the annular protuberance is provided at the inner side from a middle position in a width direction of the annular end faces, the annular end faces of the stationary core and the movable core are divided in radial direction into two parts of an inner side and an outer side, the inner side is provided with an area formed by a plating of anti wear property, the outer side is provided with an area of non-plating, the annular protuberance of the collision portion side is coated with the plating, and the non-collision portion is constituted by the area of non-plating, and wherein a relationship of the fluid gap and the annular protuberance is set so that the fluid gap is greater than a height of the annular protuberance.

5. A fuel injection valve for an internal combustion engine comprising an electromagnetic coil, a movable valve element, a stationary core, a movable core, and a spring, wherein the stationary core and the movable core are disposed in a moving direction of the movable valve element so that annular end faces of the stationary core and the movable core are opposed to each other with a predetermined gap when the electromagnetic coil is not energized, by the spring applying a spring load to the movable core in a closing-direction of the movable valve element, and the movable core is magnetically attracted toward the stationary core against force of the spring when the electromagnetic coil is energized, thereby to open the fuel injection valve, wherein the annular end faces of the stationary core and the movable core are provided respectively with collision portions that collide to each other when the movable core is magnetically attracted toward the stationary core and non-collision portions for keeping a fluid gap at areas outside or inside from the collision portions, at least one of the annular end faces of the stationary core and the movable core is comprised of an annular flat face formed at its non-collision portion and an annular protuberance formed at its collision portion so as to be higher than the annular flat face, the annular protuberance is provided at the outer side from a middle position in a width direction of the annular end faces, the annular end faces of the stationary core and the movable core are divided in radial direction into two parts of an inner side and an outer side, the outer side is provided with an area formed by a plating of anti wear property, the inner side is provided with an area of non-plating, the annular protuberance of the collision portion side is coated with the plating, and the non-collision portion is constituted by the area of non-plating, and wherein a relationship of the fluid gap and the annular protuberance is set so that the fluid gap is greater than a height of the annular protuberance.

* * * * *